US012784427B2

(12) United States Patent
Nakagawasai et al.

(10) Patent No.: US 12,784,427 B2
(45) Date of Patent: Nov. 3, 2026

(54) PRODUCT RECOGNITION APPARATUS, PRODUCT RECOGNITION SYSTEM, PRODUCT RECOGNITION METHOD, AND NON-TRANSITORY COMPUTER READABLE MEDIUM STORING PROGRAM

(71) Applicant: STEERETAIL CO., LTD., Kawasaki (JP)

(72) Inventors: Tomoya Nakagawasai, Kanagawa (JP); Kouji Yagiura, Kanagawa (JP); Terukazu Kaneko, Kanagawa (JP); Mitsuki Fujisaki, Kanagawa (JP); Hiroyasu Hasegawa, Kanagawa (JP)

(73) Assignee: SteeRetail Co., Ltd., Kawasaki (JP)

( * ) Notice: Subject to any disclaimer, the term of this patent is extended or adjusted under 35 U.S.C. 154(b) by 207 days.

(21) Appl. No.: 18/728,533

(22) PCT Filed: May 31, 2022

(86) PCT No.: PCT/JP2022/022171

§ 371 (c)(1),
(2) Date: Jul. 12, 2024

(87) PCT Pub. No.: WO2023/145104

PCT Pub. Date: Aug. 3, 2023

(65) Prior Publication Data

US 2025/0069379 A1 Feb. 27, 2025

(30) Foreign Application Priority Data

Jan. 27, 2022 (JP) ................................ 2022-010869

(51) Int. Cl.
*G06V 10/77* (2022.01)
*G06F 16/23* (2019.01)
(Continued)

(52) U.S. Cl.
CPC ........ *G06V 10/778* (2022.01); *G06F 16/2365* (2019.01); *G06F 16/51* (2019.01); *G06V 20/50* (2022.01)

(58) Field of Classification Search
CPC ... G06V 10/778; G06F 16/2365; G06F 16/51; Y02P 90/30
(Continued)

(56) References Cited

U.S. PATENT DOCUMENTS 10,565,478 B2 * 2/2020 Alekseevich .......... G06V 10/82
2015/0363642 A1 * 12/2015 Irie .................. G06F 18/23211 382/103
(Continued)

FOREIGN PATENT DOCUMENTS

WO 2021/024459 A1 2/2021
WO 2021/200392 A1 10/2021

OTHER PUBLICATIONS

International Search Report for PCT Application No. PCT/JP2022/022171, mailed on Jul. 26, 2022.

*Primary Examiner* — Neil R Mclean
(74) *Attorney, Agent, or Firm* — Tutunjian & Bitetto, P.C.

(57) ABSTRACT

A product recognition apparatus includes: a storage unit storing in advance, an image database in which image information for learning of a plurality of products and product names are associated with each other and a similar image product name list in which product names of a plurality of products whose appearances are similar to each other are associated with each other, a learning unit generating a machine-learned identification engine; an identification unit identifying a product name using the identification engine; an image management unit storing, when the identification by the identification unit is erroneous, and the identified product name and the correct product name specified by a user are not stored in the similar image product
(Continued)

name list, the image information of the target product and the correct product name in the image database.

3 Claims, 11 Drawing Sheets

(51) Int. Cl.
*G06F 16/51* (2019.01)
*G06V 10/778* (2022.01)
*G06V 20/50* (2022.01)

(58) Field of Classification Search
USPC .......................................................... 382/159
See application file for complete search history.

(56) References Cited

U.S. PATENT DOCUMENTS

| | | | | |
|---|---|---|---|---|
| 2020/0074231 | A1* | 3/2020 | Ishii | G06N 20/00 |
| 2022/0292934 | A1* | 9/2022 | Shiraishi | G06Q 20/208 |
| 2022/0343635 | A1* | 10/2022 | Shinzaki | G06Q 20/208 |

* cited by examiner

311

| PRODUCT NAME (311A) | PRODUCT IDENTIFICATION CODE (311B) | IMAGE (311C) | FEATURE POINT (311D) |
|---|---|---|---|
| GRATIN | 000000000001 | IMAGE A1, IMAGE A2… | FEATURE POINT 11, FEATURE POINT 12… |
| RICE GRATIN WITH SHRIMP | 000000000002 | IMAGE B1, IMAGE B2… | FEATURE POINT 21, FEATURE POINT 22… |
| … | … | … | … |

Fig. 4

312

312A 312B 312C 312D

| SIMILAR PRODUCT NUMBER | PRODUCT NAME (1) | PRODUCT NAME (2) | PRODUCT NAME (3) | ... |
|---|---|---|---|---|
| 000001 | GRATIN | RICE GRATIN WITH SHRIMP | STEW | ... |
| 000002 | EGG BREAD | TUNA BREAD | POTATO BREAD | ... |
| ... | ... | ... | ... | ... |
| nnnnnn | ... | ... | ... | ... |

Fig. 5

PRODUCT RECOGNITION APPARATUS, PRODUCT RECOGNITION SYSTEM, PRODUCT RECOGNITION METHOD, AND NON-TRANSITORY COMPUTER READABLE MEDIUM STORING PROGRAM

This application is a National Stage Entry of PCT/JP2022/022171 filed on May 31, 2022, which claims priority from Japanese Patent Application 2022-010869 filed on Jan. 27, 2022, the contents of all of which are incorporated herein by reference, in their entirety.

TECHNICAL FIELD

The present invention relates to a product recognition apparatus, a product recognition system, a product recognition method, and a non-transitory computer readable medium storing a program.

BACKGROUND ART

A product recognition apparatus used in a Point Of Sales (POS) system or the like photographs a target product, performs image recognition processing on the image of the target product, and identifies the product name or the like of the target product. Specifically, the product recognition apparatus stores, regarding each of a plurality of products, an image for learning of a product (hereinafter this image will be referred to as an "image for learning") and the product name of this product in association with each other in advance, performs machine learning such as deep learning, and generates a learned identification engine. The product recognition apparatus then identifies, using the learned identification engine, the product name of the target product based on the image of the target product that has been captured.

However, identification by the product recognition apparatus is not always correct. Therefore, when a result of identification made by the product recognition apparatus is erroneous regarding one target product, a user selects a correct product name by operating the product recognition apparatus. Then, after the user selects the correct product name, the image of the target product that has been captured and the correct product name are associated with each other and the associated information is newly registered in the product recognition apparatus, and then machine learning is performed again.

Patent Literature 1 discloses a technique for adjusting data used for machine learning. Specifically, in Patent Literature 1, a degree of influence of learning data used for machine learning on the machine learning is measured, data having a low degree of influence is excluded, new data that corresponds to data having a high degree of influence is acquired, and the acquired new data is added, whereby learning data is adjusted.

CITATION LIST

Patent Literature

[Patent Literature 1] International Patent Publication No. WO 2021/200392

SUMMARY OF INVENTION

Technical Problem

However, if the image of the target product and the correct product name are stored in the product recognition apparatus in such a way that they are associated with each other every time the product recognition apparatus makes an identification error, it is possible that the storage area of the product recognition apparatus may be compressed. There is another problem that, as the number of images of the target products and the number of product names stored in the product recognition apparatus increase, a learning time in the product recognition apparatus increases.

An object of the present disclosure is to provide a product recognition apparatus, a product recognition system, a product recognition method, and a program that reduce an increase in a learning time and compression of a storage area.

Solution to Problem

A product recognition apparatus according to the present disclosure includes: storage means for storing in advance, regarding each of a plurality of products, an image database in which at least image information for learning and a product name are associated with each other; learning means for performing machine learning using the image information for learning and the product name stored in the image database to generate a learned identification engine; and identification means for identifying a product name of the target product based on the image information of the target product using the identification engine, in which the storage means further stores in advance, when the image information for learning of one product is similar to the image information for learning of another product, a similar image product name list in which the product name of the one product and the product name of the other product are associated with each other, and the product recognition apparatus further includes image management means for determining, when the product name of the target product identified by the identification means is erroneous and a correct product name has been specified by a user, whether or not the product name identified by the identification means and the correct product name are stored in the similar image product name list in such a way that they are associated with each other, and storing, when the product name identified by the identification means and the correct product name are not stored in the similar image product name list in such a way that they are associated with each other, the image information of the target product and the correct product name in the image database in such a way that they are associated with each other.

A product recognition system according to the present disclosure is a product recognition system including a product recognition server and a terminal apparatus capable of communicating with the product recognition server, in which the terminal apparatus includes acquisition means for acquiring image information of a plurality of target products, the product recognition server includes: storage means for storing in advance, regarding each of a plurality of products, an image database in which at least image information for learning and a product name are associated with each other; learning means for performing machine learning using the image information for learning and the product name stored in the image database to generate a learned identification engine; and identification means for identifying, by using the identification engine, a product name of the target product based on the image information of the target product acquired by the acquisition means, the storage means further stores in advance, when the image information for learning of one product is similar to the image information for learning of another product, a similar image product name list in which the product name of the one product and the product name of the other product are associated with each other, the terminal apparatus further includes feedback means for transmitting, when the product name of the target product identified by the identification means is erroneous and a correct product name has been specified by a user, the image information of the target product and the correct product name specified by the user to the product recognition server, and the product recognition server further includes image management means for determining whether or not the correct product name transmitted from the terminal apparatus and the product name identified by the identification means are stored in the similar image product name list in such a way that they are associated with each other and storing, when the product name identified by the identification means and the correct product name are not stored in the similar image product name list in such a way that they are associated with each other, the image information of the target product and the correct product name in the image database in such a way that they are associated with each other.

In a product recognition method according to the present disclosure, a product recognition apparatus: stores in advance, regarding each of a plurality of products, an image database in which at least image information for learning and a product name are associated with each other; performs machine learning using the image information for learning and the product name stored in the image database to generate a learned identification engine; identifies a product name of a target product based on the image information of the target product using the identification engine; further stores in advance, when the image information for learning of one product is similar to the image information for learning of another product, a similar image product name list in which the product name of the one product and the product name of the other product are associated with each other; and determines, when the identified product name of the target product is erroneous and the correct product name has been specified by a user, whether or not the identified product name and the correct product name are stored in the similar image product name list in such a way that they are associated with each other, and stores, when the identified product name and the correct product name are not stored in the similar image product name list in such a way that they are associated with each other, the image information of the target product and the correct product name in the image database in such a way that they are associated with each other.

A non-transitory computer readable medium storing a program according to the present disclosure causes a product recognition apparatus to execute: processing for storing in advance, regarding each of a plurality of products, an image database in which at least image information for learning and a product name are associated with each other; processing for performing machine learning using the image information for learning and the product name stored in the image database to generate a learned identification engine; processing for identifying, using the identification engine, a product name of a target product based on the image information of the target product; and processing for further storing in advance, when the image information for learning of one product is similar to the image information for learning of another product, a similar image product name list in which the product name of the one product and the product name of the other product are associated with each other; and processing for determining, when the identified product name of the target product is erroneous and the correct product name has been specified by a user, whether or not the identified product name and the correct product name are stored in the similar image product name list in such a way that they are associated with each other and storing, when the identified product name and the correct product name are not stored in the similar image product name list in such a way that they are associated with each other, the image information of the target product and the correct product name in the image database in such a way that they are associated with each other.

BRIEF DESCRIPTION OF DRAWINGS

From the following description alone and together with the accompanying drawings, example embodiments of the present invention will be understood by and readily apparent to those skilled in the art.

FIG. 4 is a diagram showing a data structure of an image database according to the second example embodiment;

FIG. 5 is a diagram showing a data structure of a similar image product name list according to the second example embodiment;

EXAMPLE EMBODIMENT

Example embodiments will be described below with reference to the drawings. Since the drawings are simple, the technical range of the example embodiments should not be interpreted narrowly on the basis of the description of the drawings. The same elements are denoted by the same reference signs, and repeated descriptions are omitted.

The disclosure will be described by dividing it into a plurality of sections or example embodiments whenever circumstances require it for convenience in the following example embodiments. However, unless otherwise particularly specified, these sections or example embodiments are not irrelevant to one another. One section or example embodiment is related to modified example, applications, details, supplementary explanations, and the like of some or all of the other ones. When reference is made to the number of elements or the like including the number of pieces, numerical values, quantity, range, etc. in the following example embodiments, the number thereof is not limited to a specific number and may be greater than or less than or equal to the specific number unless otherwise particularly specified and definitely limited to the specific number in principle.

Further, in the following example embodiments, components (including operation steps, etc.) are not always essential unless otherwise particularly specified and considered to be definitely essential in principle. Similarly, when reference is made to the shapes, positional relations, or the like of the components or the like in the following example embodiments, they will include ones, for example, substantially approximate or similar in their shapes or the like unless otherwise particularly specified and considered not to be definitely so in principle. This is similarly applied even to the above-described number or the like (including the number of pieces, numerical values, quantity, range, etc.)

First Example Embodiment

Figure 1:
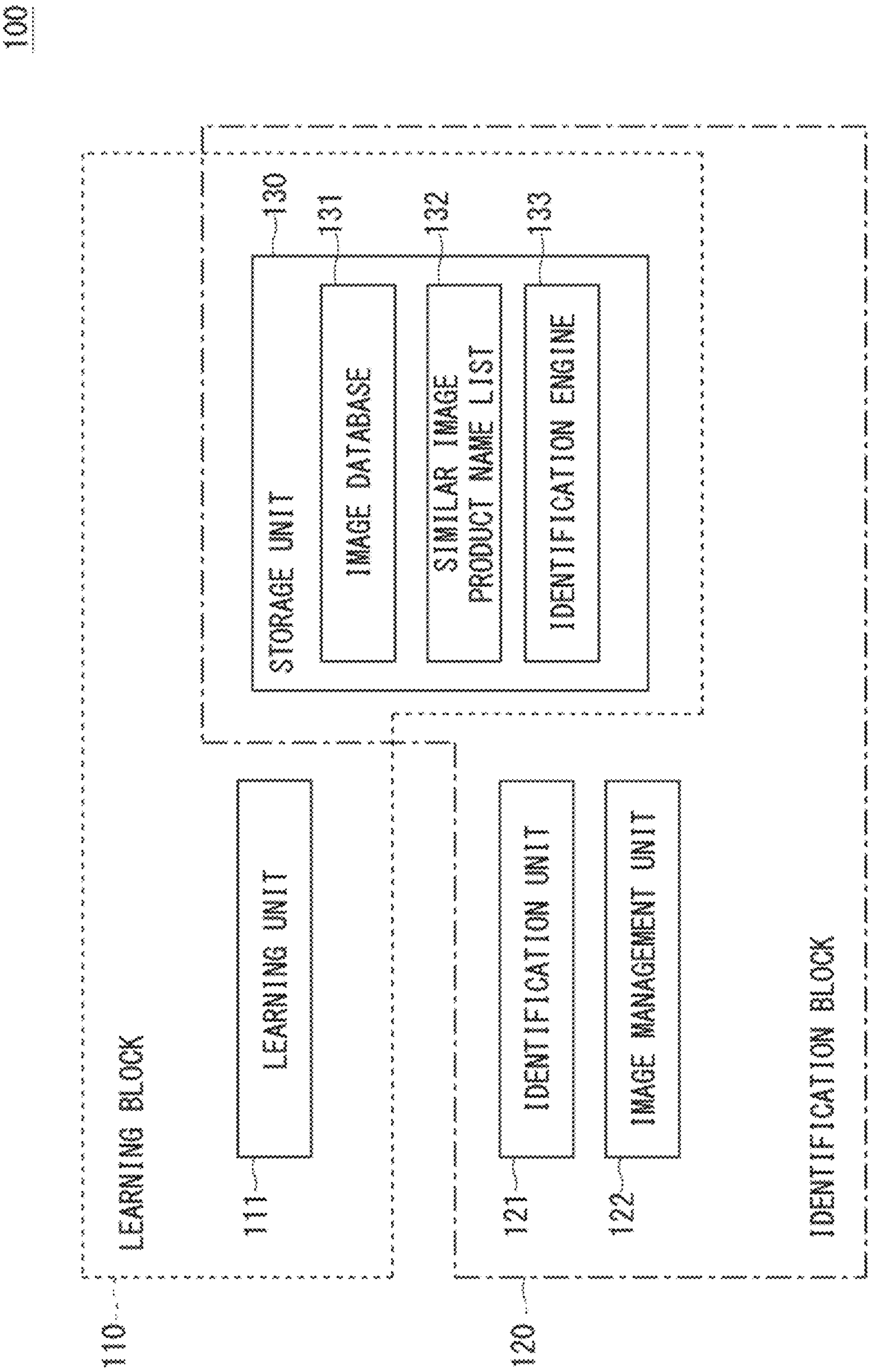
FIG. 1 is a block diagram showing a configuration of a product recognition apparatus according to a first example embodiment.

With reference to FIG. 1, a first example embodiment will be described. FIG. 1 is a block diagram showing a configuration of a product recognition apparatus 100 according to the first example embodiment.

The product recognition apparatus 100 according to the first example embodiment is an apparatus configured to register information on products in a database. The product recognition apparatus 100 is, for example, an apparatus that is used in a POS system or the like, recognizes a product at a time when this product is sold, and registers sales data of this product in a sales database. Note that the database may be stored in a storage unit 130 that will be described later or may be stored in an external server or the like of the product recognition apparatus 100.

As shown in FIG. 1, the product recognition apparatus 100 includes a learning block 110 that performs machine learning and an identification block 120 that performs identification of a product name. The learning block 110 includes a learning unit 111 and a storage unit 130. The identification block 120 includes an identification unit 121, an image management unit 122, and a storage unit 130. In other words, the learning block 110 and the identification block 120 share the storage unit 130.

The storage unit 130 stores an image database 131, a similar image product name list 132, an identification engine 133 and the like.

The image database 131 is a database in which, regarding each of a plurality of products, at least image information for learning the product (hereinafter this information will be referred to as "image information for learning") and the product name of the product are associated with each other. In other words, the image database 131 is a database in which, for each of the plurality of products, image information for learning the product and the product name of the product, which is a ground-truth label, are associated with each other.

The similar image product name list 132 is a list in which, regarding each of a plurality of products, a product name of one product and a product name of another product are associated with each other when image information for learning of one product is similar to image information for learning of the other product. In other words, the similar image product name list 132 is a list in which product names of products whose image information pieces for learning are similar to one another are associated with each other.

The identification engine 133 is a machine learning model for identifying the product name of the product based on the image information of the product. In other words, the identification engine 133 is a machine learning model that receives image information of a product, infers the product name of the product, and outputs the inferred product name. The machine learning herein may indicate, but is not particularly limited to, deep learning.

The learning unit 111 performs machine learning using the image information for learning and the product name stored in the image database 131 to generate a learned identification engine 133. Specifically, the learning unit 111 inputs the image information for learning stored in the image database 131 into the identification engine 133 to cause the product name to be inferred, and updates a weight (the weight is also called "weighting") of a parameter used in the identification engine 133 in such a way that the result of inference (product name) becomes the product name (ground-truth label) stored in the image database 131. The learning unit 111 thus generates the learned identification engine 133. Further, the learning unit 111 stores, in the storage unit 130, the learned identification engine 133 that has been generated.

The identification unit 121 identifies the product name of the target product based on the image information of the target product using the learned identification engine 133. Specifically, the identification unit 121 inputs the image information of the target product to the identification engine 133 to cause the product name of the target product to be inferred, and outputs a product name as a result of inference. The product name output from the identification unit 121 is displayed on a display unit (not shown) of the product recognition apparatus 100 and presented to the user.

When the product name displayed on a display unit (not shown) of the product recognition apparatus 100 is erroneous, the user specifies the correct product name by operating an input unit (not shown) of the product recognition apparatus 100.

After the correct product name is specified by the user in the product recognition apparatus 100, the image management unit 122 determines whether or not the product name identified by the identification unit 121 and the correct product name specified by the user are stored in the similar image product name list 132 in such a way that they are associated with each other. When the product name identified by the identification unit 121 and the correct product name specified by the user are not stored in the similar image product name list 132 in such a way that they are associated with each other, the image management unit 122 stores the image information of the target product and the correct product name in the image database 131 in such a way that they are associated with each other.

According to the first example embodiment, it is possible to provide the product recognition apparatus 100 that reduces the increase in the learning time and the compression of the storage area. Specifically, when the product name identified by the identification unit 121 is erroneous and the correct product name has been specified by the user, the image management unit 122 determines whether or not the product name identified by the identification unit 121 and the correct product name specified by the user are stored in the similar image product name list 132 in such a way that they are associated with each other. When the product name identified by the identification unit 121 and the correct product name specified by the user are not stored in the similar image product name list 132 in such a way that they are associated with each other, the image management unit

122 stores the image information of the target product and the correct product name in the image database 131 in such a way that they are associated with each other. Therefore, it is possible to prevent similar image information from being stored in the image database 131 for a plurality of product names with no difference in appearance characteristics, such as breads with similar shapes but different contents, whereby it is possible to reduce compression of the storage area. It is further possible to reduce the increase in the learning time, which occurs due to an increase in the amount of data stored in the image database 131. Accordingly, it is possible to provide the product recognition apparatus 100 that reduces the increase in the learning time and the compression of the storage area.

Second Example Embodiment

Figure 2:
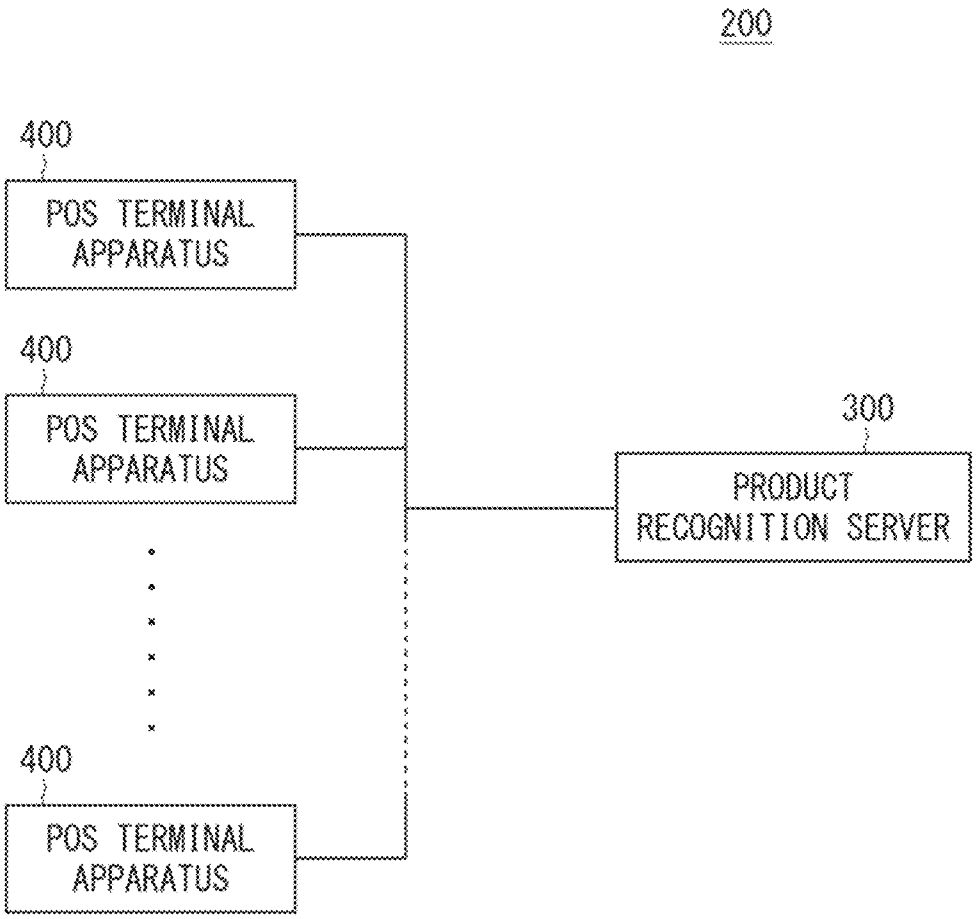
FIG. 2 is a block diagram showing a configuration of a product recognition system according to a second example embodiment.

With reference to FIG. 2, a second example embodiment will be described. FIG. 2 is a block diagram showing a configuration of a product recognition system 200 according to the second example embodiment.

While the product recognition system 200 of the second example embodiment is configured as a POS system used in, for example, a restaurant or a supermarket, this is merely an example and the product recognition system 200 may be any system including a server and a terminal apparatus that can perform communication. In the second example embodiment, the product recognition system 200 includes a product recognition server 300 and a POS terminal apparatus 400. The product recognition server 300 and the POS terminal apparatus 400 can communicate with each other. Further, the product recognition system 200 may include a plurality of POS terminal apparatuses 400. In other words, the product recognition server 300 and the plurality of POS terminal apparatuses 400 may communicate with each other.

Figure 3:
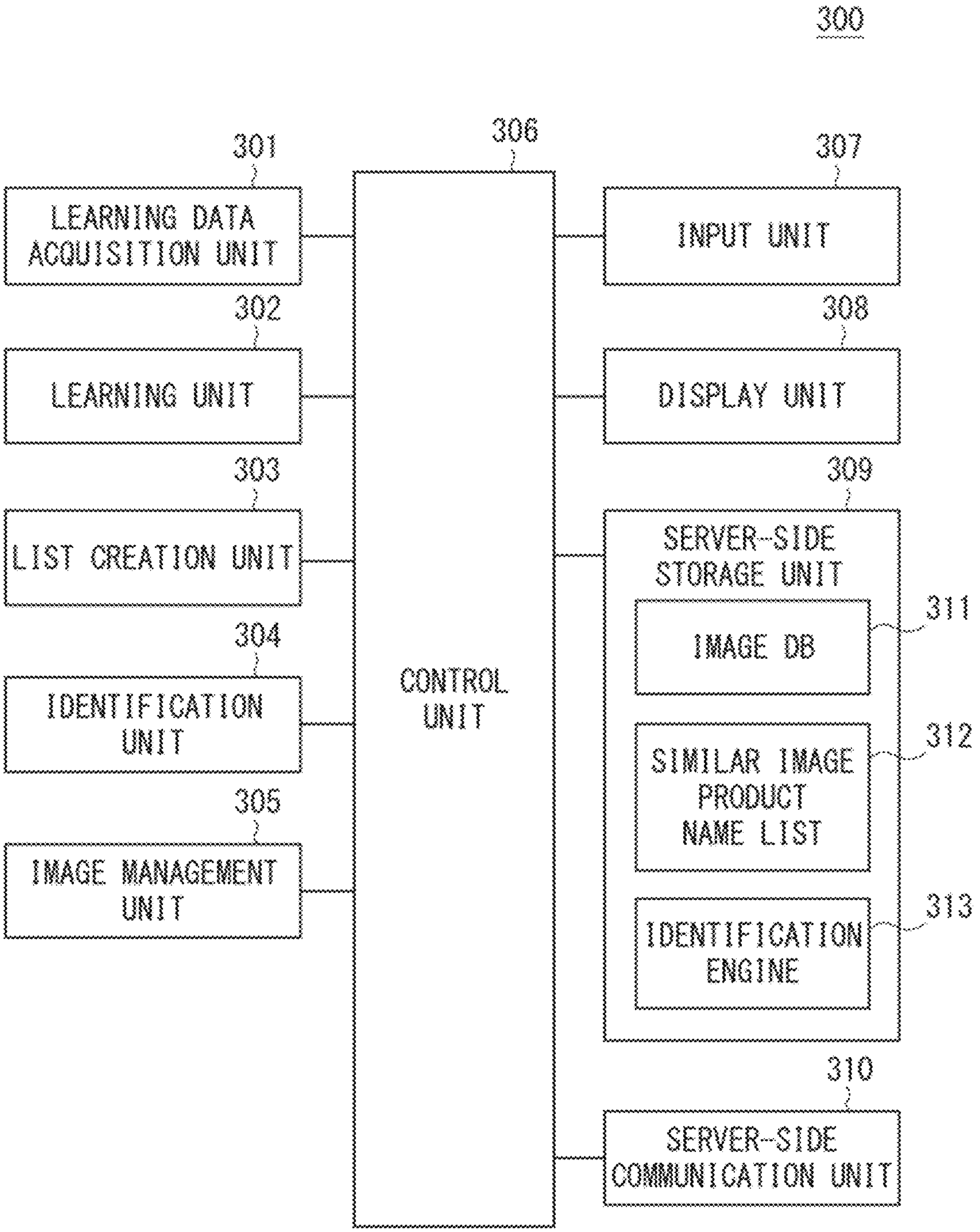
FIG. 3 is a block diagram showing a configuration of a product recognition server according to the second example embodiment.

FIG. 3 shows one example of a configuration of the product recognition server 300. As shown in FIG. 3, the product recognition server 300 includes a learning data acquisition unit 301, a learning unit 302, a list creation unit 303, an identification unit 304, an image management unit 305, a control unit 306, an input unit 307, a display unit 308, a server-side storage unit 309, and a server-side communication unit 310. The input unit 307 and the display unit 308 may be integrally configured as a display with a touch panel or may be provided separately from each other. As will be described later, the product recognition server 300 identifies the product name of the target product based on the image information of the target product acquired in the POS terminal apparatus 400 using an identification engine 313 (described later). The product recognition server 300 may further include a function for managing various kinds of sales information such as management of the operation status of the POS terminal apparatus 400.

The learning data acquisition unit 301 acquires image information for learning of the product captured by the POS terminal apparatus 400 and the product name of the product. The image information for learning of the product includes an image of a product used for machine learning (hereinafter it will be referred to as an "image for learning") and one or more feature points calculated from this image for learning. Further, the image for learning of the product may be an image that is useful to recognize a product and may be, for example, an image obtained by photographing the product from the top or an image obtained by photographing the product from the side. Further, the image information for learning may be binary information of the image for learning or information regarding a storage-destination path of the image for learning, both of which specifying the image for learning. In the description herein, the image for learning of the product and one or more feature points calculated from the image for learning will be used as an example as the image information for learning. Further, the image for learning also serves as a reference image for performing identification of the target product. Note that the learning data acquisition unit 301 may include a camera that photographs a product, and an image of a product captured by the camera may be acquired as an image for learning. The learning data acquisition unit 301 associates the acquired image information for learning with the product name and registers the associated image in an image database 311 (described later). Note that the image information for learning and the product name may be registered in the image database 311 by the user.

Further, the learning data acquisition unit 301 may further read product identification information such as a barcode or a QR code (registered trademark) of a product from the image of the product transmitted from the POS terminal apparatus 400. Further, the learning data acquisition unit 301 may acquire, from the POS terminal apparatus 400, product identification information such as the product barcode read from the image of the product by the POS terminal apparatus 400. The learning data acquisition unit 301 may associate the acquired product identification information with the image for learning and the product name, and register the associated information in the image database 311 (described later).

The learning unit 302 performs machine learning using the image information for learning and the product name stored in the image database 311 stored in the server-side storage unit 309 to generate the learned identification engine 313. Specifically, the learning unit 302 inputs the image for learning stored in the image database 311 into the identification engine 313 to cause the product name to be inferred, and updates a weight (this weight is also referred to as "weighting") of a parameter used in the identification engine 313 in such a way that the result of inference (product name) becomes the product name (ground-truth label) stored in the image database 311. Accordingly, the learning unit 302 generates the learned identification engine 313. The learning unit 302 further stores, in the server-side storage unit 309, the learned identification engine 313 that is generated.

More specifically, the learning unit 302 inputs the image for learning of the product stored in the image database 311 into the identification engine 313, whereby one or more feature points of this image for learning is calculated in the identification engine 313. Since the processing for calculating the feature points from the image for learning is similar to the known image recognition processing, the details thereof will not be described again. Next, the identification engine 313 calculates, for each of a plurality of products stored in the image database 311, a degree of similarity based on the feature points of the product and the feature points calculated from the input image for learning. The degree of similarity is an index indicating how much one image is similar to another image. Then, the product name whose degree of similarity here is the highest among the product names stored in the image database 311 is output from the identification engine 313 as the product name of the product of the input image for learning. Next, the learning unit 302 calculates the difference between the product name output from the identification engine 313 and the product name (ground-truth label) of the image for learning input to the identification engine 313. When this difference is larger than a predetermined value, the learning unit 302 updates the weight of the parameter used in the identification engine 313 and performs the aforementioned processing again. When this difference becomes equal to or smaller than the predetermined value, the learning unit 302 determines that the machine learning has ended, and stores the identification engine 313 regarding which the weight has been updated in the server-side storage unit 309. Note that the predetermined value is a relatively small value determined depending on the purpose.

The list creation unit 303 creates a similar image product name list 312. Specifically, the list creation unit 303 compares feature points of an image for learning of one product with feature points of an image for learning of another product stored in the image database 311 to calculate the degree of similarity between then. Next, the list creation unit 303 creates a similar image product name list 312 in which product names of a plurality of products whose degrees of similarity are equal to or larger than a predetermined value are associated with each other. Then, the created similar image product name list 312 is stored in the server-side storage unit 309.

The identification unit 304 acquires the image of the target product transmitted from the POS terminal apparatus 400. Then, the identification unit 304 identifies the product name of the target product based on the image of the target product using the learned identification engine 313. Specifically, the identification unit 304 inputs the image of the target product transmitted from the POS terminal apparatus 400 into the identification engine 313 to cause the product name of the target product to be inferred.

More specifically, the identification unit 304 inputs the image of the target product into the learned identification engine 313, whereby the identification engine 313 calculates one or more feature points of the image of the target product. Next, the identification engine 313 compares the feature points of the image of the target product with the feature points of the reference image stored in the server-side storage unit 309, whereby the degree of similarity between the image of the target product and the reference image of the product stored in the server-side storage unit 309 is calculated. Note that the identification unit 304 uses the image for learning stored in the image database 311 as the reference image. Further, the identification unit 304 may acquire an image including image parts of a plurality of target products transmitted from the POS terminal apparatus 400. In this case, the identification unit 304 specifies, from the image including the image parts of the plurality of target products, the image part of each of the plurality of target products, and inputs, for each of the target products, the image part of the target product into the learned identification engine 313 to cause the degree of similarity to be calculated. Then, the learned identification engine 313 outputs, as a result of inference, for each of the target products, the product name of the product stored in the image database 311 associated with the degree of similarity.

Since the processing for calculating the feature points from the image of the target product is similar to the known image recognition processing, the details thereof will not be described again. Further, the calculated degree of similarity is also called a “score”.

Then, the identification unit 304 sets, as the product name of the target product, the product name having the highest degree of similarity among the degrees of similarity output from the learned identification engine 313.

Further, the identification unit 304 sets a predetermined number of product names as product names of candidate products in a descending order of the degree of similarity output from the learned identification engine 313.

Then, the server-side communication unit 310 transmits the product name of the target product set by the identification unit 304 and its degree of similarity and the product names of the candidate products set by the identification unit 304 and its degrees of similarity to the POS terminal apparatus 400. Note that the product name of the target product may be included in the product names of the candidate products.

The POS terminal apparatus 400 causes a display unit 407 (described later) to display the product name of the target product transmitted from the product recognition server 300. Further, the POS terminal apparatus 400 displays product names of a predetermined number of candidate products transmitted from the product recognition server 300 on the display unit 407 in such a way that one of them can be selected. When the product name of the target product displayed on the display unit 407 of the POS terminal apparatus 400 is erroneous, the user operates an input unit 406 (described later) of the POS terminal apparatus 400 to specify the correct product name from the product names of the candidate products displayed on the display unit 407 in such a way that one of them can be selected.

After the correct product name is specified by the user in the POS terminal apparatus 400, the image management unit 305 determines whether or not the product name identified by the identification unit 304 as the product name of the target product and the correct product name specified by the user are stored in the similar image product name list 312 in such a way that they are associated with each other.

When the product name identified by the identification unit 304 as the product name of the target product and the correct product name specified by the user are not stored in the similar image product name list 312 in such a way that they are associated with each other, the image management unit 305 stores the image information of the target product and the correct product name in the image database 311 in such a way that they are associated with each other.

Further, the product name identified by the identification unit 304 as the product name of the target product and the correct product name specified by the user are stored in the similar image product name list 312 in such a way that they are associated with each other, the image management unit 305 does not store the image information of the target product and the correct product name in the image database 311 in such a way that they are associated with each other.

Alternatively, when the product name identified by the identification unit 304 as the product name of the target product and the correct product name specified by the user are stored in the similar image product name list 312 in such a way that they are associated with each other, the image management unit 305 may measure the number of times the image information of the target product and the correct product name are stored in the image database 311 in such a way that they are associated with each other. Then, when the number of times exceeds a predetermined value, the image management unit 305 may stop the storage of the image information of the target product and the correct product name in the image database 311.

The control unit 306 controls an operation of each unit of the product recognition server 300. The control unit 306 includes a Central Processing Unit (CPU), storage means, an input/output port (I/O), etc. The storage means may be a Read Only Memory (ROM), a Random Access Memory (RAM), etc. Then, the Central Processing Unit (CPU)

executes various kinds of programs stored in the storage means, whereby the function of the control unit 306 is implemented.

The input unit 307 receives an operation instruction from a user. The input unit 307 may be composed of a keyboard or a touch panel display apparatus. The input unit 307 may be composed of a keyboard or a touch panel connected to a main body of the product recognition server 300. Note that the operation instruction from the user may be accepted by the input unit 406 of the POS terminal apparatus 400, not by the input unit 307.

The display unit 308 displays images of products acquired by the learning data acquisition unit 301. The display unit 308 may display candidates of the product names based on the feature points of the product calculated by the identification unit 304 in feature point calculation processing. The display unit 308 is composed of various display means such as a Liquid Crystal Display (LCD) and a Light Emitting Diode (LED). The contents displayed on the display unit 308 may be displayed on a display unit 407 of the POS terminal apparatus 400. Further, the contents displayed on the display unit 308 may be displayed on a device such as a mobile phone including a so-called smartphone owned by the user.

The server-side storage unit 309 stores the image database 311, the similar image product name list 312, the identification engine 313, etc. The server-side storage unit 309 may further include a non-volatile memory (e.g., Read Only Memory (ROM)) in which various programs and various kinds of data necessary for processing are fixedly stored. Further, the server-side storage unit 309 may be the one that uses an HDD or an SSD. Further, the server-side storage unit 309 may include a volatile memory (e.g., Random Access Memory (RAM)) used as a work area. The program may be read from a portable recording medium such as an optical disk or a semiconductor memory, or may be downloaded from a server apparatus on a network.

The image database 311 is a database in which, regarding each of a plurality of products, at least image information for learning of the product and the product name of the product are associated with each other. In the description herein, an example in which an image for learning of the product and one or more feature points calculated from the image for learning are used as the image information for learning. Further, the image for learning also serves as a reference image for performing identification of a product. FIG. 4 shows one example of a data structure of the image database 311. As shown in FIG. 4, the image database 311 stores a product name 311A of the product, a product identification code 311B, which is product identification information, an image for learning (reference image) 311C, and feature points 311D calculated from the image for learning in advance in association with one another. Here, the product identification code 311B is acquired, for example, from the image of the product transmitted from the POS terminal apparatus 400 by the learning data acquisition unit 301. Further, as the product identification code, for example, a code for identifying a product such as a Price Look Up (PLU) code or a Japanese Article Number (JAN) code can be used. Further, the image for learning 311C is an image of the product acquired by the learning data acquisition unit 301, and is, for example, an image of the product captured by the POS terminal apparatus 400. In other words, the image database 311 is a database in which, for each of a plurality of products, the product name of the product 311A, the product identification code 311B, the image for learning 311C, and the feature points 311D, as a ground-truth label.

The similar image product name list 312 is a list in which, when image information for learning of one product is similar to image information for learning of another product regarding a plurality of products, the product name of one product and the product name of the other product are associated with each other. In other words, the similar image product name list 312 is a list in which product names of products whose images for learning 311C are similar to one another are associated with each other. Further, the similar image product name list 312 is the one created by the list creation unit 303. More specifically, the similar image product name list 312 stores, when the degree of similarity between feature points 311D of one product stored in the image database 311 and feature points 311D of another product is equal to or larger than a predetermined value, the product name 311A of one product in association with the product name 311A of the other product.

FIG. 5 shows one example of a data structure of the similar image product name list 312. As shown in FIG. 5, the similar image product name list 312 stores, for each similar product number 312A, the product names 312B, 312C, 312D, . . . of the products whose images for learning 311C are similar to one another in association with one another. For example, in the example shown in FIG. 5, the similar image product name list 312 stores, in a row of a similar product number "000001", the product names of the products "gratin", "rice gratin with shrimp", "stew", . . . whose images for learning 311C are similar to one another in association with one another. Further, the similar image product name list 312 stores, in the row of a similar product number "000002", the product names of the products "egg bread", "tuna bread", "potato bread", . . . whose images for learning 311C are similar to one another in association with one another.

The identification engine 313 is a machine learning model that identifies the product name of the product based on image information of the product. In other words, the identification engine 313 is a machine learning model that receives image information of a product, infers the product name of this product, and outputs the inferred product name. The machine learning herein may indicate, but is not particularly limited to, deep learning.

The server-side communication unit 310 communicates with the POS terminal apparatus 400. The server-side communication unit 310 may include an antenna (not shown) for performing radio communication with the POS terminal apparatus 400, or may include an interface such as a Network Interface Card (NIC) for performing wired communication. Then, the server-side communication unit 310 receives the image of the target product transmitted from the POS terminal apparatus 400. The server-side communication unit 310 further transmits, regarding the target product, the product name of the target product identified by the identification unit 304 and its degree of similarity, and the product names of the candidate products and its degrees of similarity to the POS terminal apparatus 400.

Figure 6:
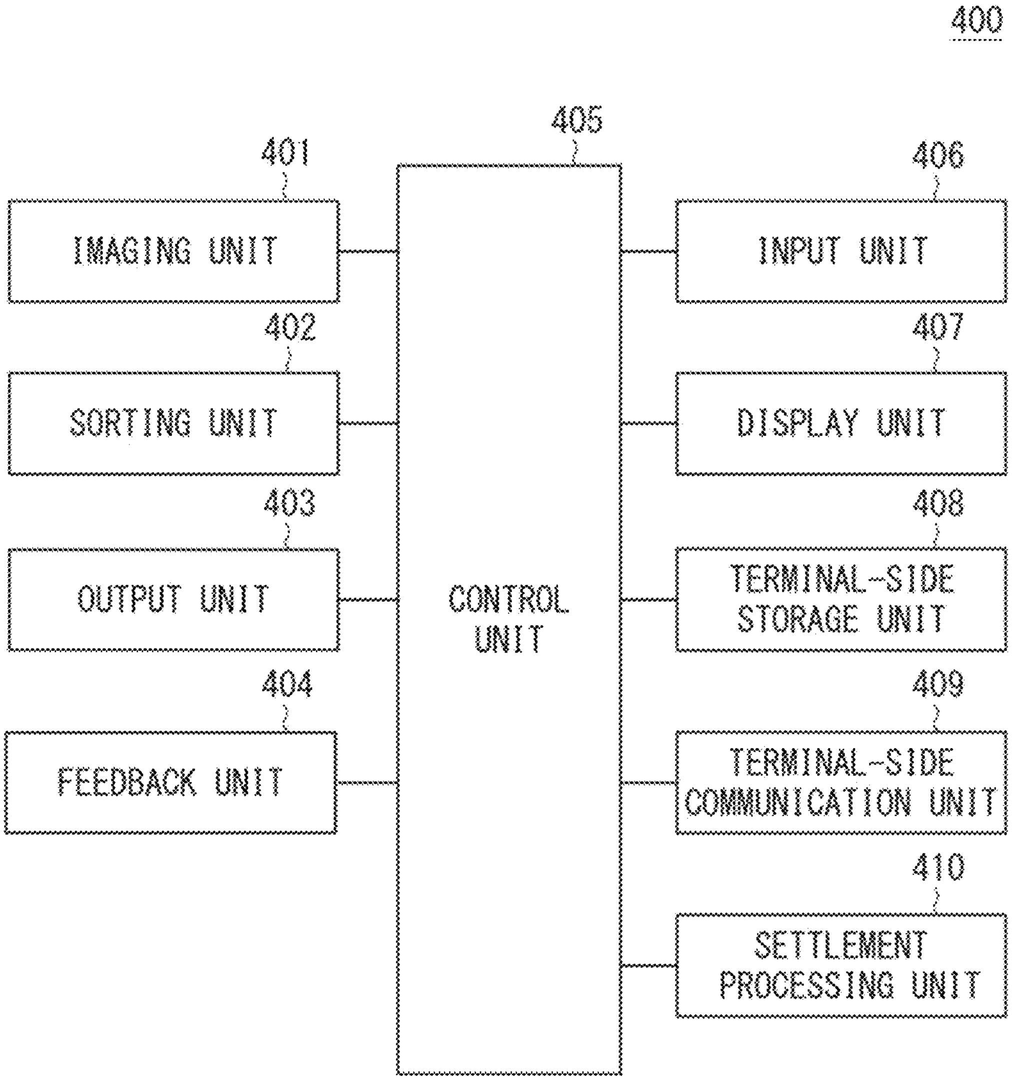
FIG. 6 is a block diagram showing a configuration of a POS terminal apparatus according to the second example embodiment.

FIG. 6 shows one example of a configuration of the POS terminal apparatus 400. The POS terminal apparatus 400 includes an imaging unit 401, a sorting unit 402, an output unit 403, a feedback unit 404, a control unit 405, an input unit 406, a display unit 407, a terminal-side storage unit 408, a terminal-side communication unit 409, and a settlement processing unit 410. The input unit 406 and the display unit 407 may have one configuration as a display with a touch panel or may be provided separately from each other. The POS terminal apparatus 400 is, for example, a dedicated computer installed at a cash register. As will be described later, the POS terminal apparatus 400 photographs the target product, displays the product name of the target product and the product names of the candidate products in such a way that one of them can be selected based on the degree of similarity transmitted from the product recognition server 300, and performs settlement processing.

The imaging unit 401 photographs the target product to be registered and acquires the image of the target product. Further, the imaging unit 401 may collectively photograph a plurality of target products to be registered and acquire an image including image parts of a plurality of target products. Further, the imaging unit 401 may acquire the image for learning of the products. Further, the imaging unit 401 may include a function of reading product identification information such as a barcode or a QR code (registered trademark) of the product. The imaging unit 401 may include a camera that photographs the target product. The image of the target product acquired by the imaging unit 401, the image for learning of the product, and the product identification information are transmitted to the product recognition server 300 by the terminal-side communication unit 409.

The sorting unit 402 sorts the product names of the candidate products transmitted from the product recognition server 300 in a descending order of the degree of similarity.

The output unit 403 generates a composite image displayed in a predetermined part of the screen on the display unit 407 (described later) and a candidate product list displayed in another part of the screen on the display unit 407.

Specifically, the output unit 403 generates a composite image in which the product name of the target product identified by the identification unit 304 is superimposed on the image part of the target product.

Further, the output unit 403 generates a candidate product list in which product names of the candidate products are arranged in accordance with the order sorted by the sorting unit 402 in such a way that one of them can be selected.

Further, the composite image and the candidate product list generated by the output unit 403 are output to the display unit 407 and displayed on the display unit 407.

When the product name of the target product displayed on the display unit 407 is erroneous, the user specifies the correct product name by operating the input unit 406 (described later). After the user specifies the correct product name, the feedback unit 404 outputs the correct product name to the terminal-side communication unit 409, and the terminal-side communication unit 409 transmits this correct product name to the product recognition server 300.

The control unit 405 controls an operation of each unit of the POS terminal apparatus 400. The control unit 405 includes a Central Processing Unit (CPU), storage means, an input/output port (I/O), etc. The storage means may be a Read Only Memory (ROM), a Random Access Memory (RAM), etc. Then, the Central Processing Unit (CPU) executes various kinds of programs stored in the storage means, whereby the functions of the control unit 405 are implemented.

Since the input unit 406 and the display unit 407 respectively include functions similar to those of the input unit 307 and the display unit 308 of the product recognition server 300, the descriptions thereof will be omitted.

Since the configuration and so on of the terminal-side storage unit 408 are similar to those of the server-side storage unit 309, the descriptions thereof will be omitted.

The terminal-side communication unit 409 communicates with the product recognition server 300. The terminal-side communication unit 409 may include an antenna (not shown) that performs radio communication with the product recognition server 300, and may include an interface such as a Network Interface Card (NIC) for performing wired communication. Then, the terminal-side communication unit 409 transmits the image of the target product, the image for learning of the product, and the product identification information acquired by the imaging unit 401 to the product recognition server 300. Further, the terminal-side communication unit 409 receives the product name of the target product and its degree of similarity, and the product names of the candidate products and its degrees of similarity, transmitted from the product recognition server 300. Further, the terminal-side communication unit 409 transmits the correct product name input from the feedback unit 404 to the product recognition server 300.

The settlement processing unit 410 calculates the total amount of the products that the user purchases, for example, and performs settlement processing. The settlement processing unit 410 may include a function of processing sales and the content of the sales.

Figure 7:
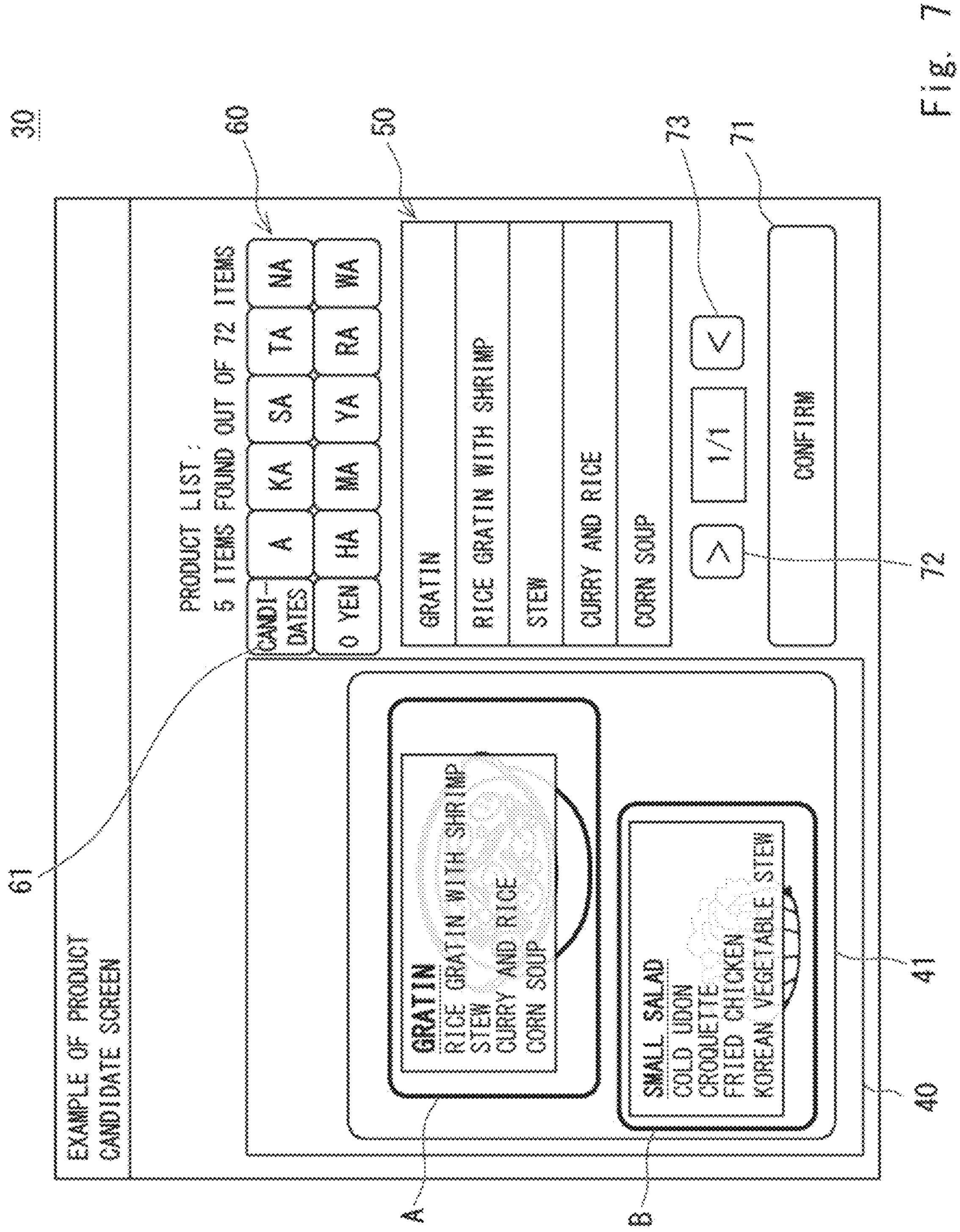
FIG. 7 is a diagram showing one example of a display screen of the POS terminal apparatus according to the second example embodiment.

FIG. 7 shows one example of a screen 30 of the display unit 407 that displays a composite image 40 and a candidate product list 50 generated by the output unit 403. In FIG. 7, the display unit 407 is a touch panel. In the screen 30 shown in FIG. 7, the composite image 40 is displayed on the left side of the screen 30 and the candidate product list 50 is displayed on the right side of the screen 30. In the candidate product list 50, of the candidate products, product names of the first to fifth candidate products are arranged in a descending order of the degrees of similarity in such a way that one of them can be selected. Further, on the screen 30 shown in FIG. 7, selection buttons 60 for adding candidate products to the candidate product list 50 as a result of an operation by the user are displayed above the candidate product list 50. The selection buttons 60 include the Japanese “A column” button, the Japanese “KA column” button, . . . , the Japanese “WA column” button, a “candidate” button 61, and a “0 yen” button. Then, when the user touches the Japanese “A column” button on the selection buttons 60, product names of the first to fifth candidate products starting from the character of the Japanese “A column” are arranged in the candidate product list 50 in a descending order of the degrees of similarity in such a way that one of them can be selected. Besides the above elements, images of a “confirm” button 71, a “page up” button 72, a “page down” button 73, and the like are displayed on the screen 30 shown in FIG. 7.

In the example shown in FIG. 7, when a user (customer) makes a payment using the POS terminal apparatus 400 in a restaurant, the imaging unit 401 photographs a tray 41 on which a plurality of target products to be purchased by the user are placed. Then, an image including image parts of a plurality of target products captured by the imaging unit 401 is transmitted to the product recognition server 300. In the example shown in FIG. 7, two target products A and B are placed on the tray 41, the target product A being “rice gratin with shrimp” and the target product B being “small salad”.

Then, the identification unit 304 identifies, for each of the two target products A and B, the product name having the highest degree of similarity as the product name of the target product and sets a predetermined number of product names as the product names of the candidate products in a descending order of the degree of similarity. In the example shown in FIG. 7, five product names “gratin”, “rice gratin with shrimp”, “stew”, “curry and rice”, and “corn soup” are set in a descending order of the degree of similarity as the product names of the candidate products for the target product A, and five product names “small salad”, “cold udon”, “croquette”, "fried chicken", "Korean vegetable stew" are set in a descending order of the degree of similarity as the product names of the candidate products for the target product B.

Next, the sorting unit 402 sorts, for each of the target products A and B, the product names of the candidate products set by the identification unit 304 in a descending order of the degree of similarity. In the example shown in FIG. 7, regarding the target product A, product names of five candidate products "gratin", "rice gratin with shrimp", "stew", "curry and rice", and "corn soup" are sorted in a descending order of the degree of similarity. Further, regarding the target product B, product names of five candidate products "small salad", "cold udon", "croquette", "fried chicken", and "Korean vegetable stew" are sorted in a descending order of the degree of similarity.

Then, the output unit 403 generates a composite image 40 and a candidate product list 50. At this time, the output unit 403 generates a composite image 40 in which the product name of the target product identified by the identification unit 304 is superimposed on the image part of the target product. Further, the output unit 403 generates a candidate product list 50 in which the product names of the candidate products are arranged in the order sorted by the sorting unit 402 in such a way that one of them can be selected. In the example shown in FIG. 7, in the composite image 40, the product names "gratin", "rice gratin with shrimp", "stew", "curry and rice", and "corn soup" are superimposed on the image part of the target product A, and the product names "small salad", "cold udon", "croquette", "fried chicken", and "Korean vegetable stew" are superimposed on the image part of the target product B. Further, in the composite image 40, the product name "gratin" identified by the identification unit 304 regarding the target product A is underlined, and the product name "small salad" identified by the identification unit 304 regarding the target product B is underlined. Further, in the example shown in FIG. 7, in the candidate product list 50, the product names of the candidate products of the target product A "gratin", "rice gratin with shrimp", "stew", "curry and rice", and "corn soup" are arranged in such a way that one of them can be selected.

Since the target product A is "rice gratin with shrimp" in the example shown in FIG. 7, the product name "gratin" of the target product A displayed on the composite image 40 is erroneous. Therefore, the user selects the correct product name "rice gratin with shrimp" from the candidate product list 50. At this time, the output unit 403 may underline the letters "rice gratin with shrimp" indicating the product name of the candidate product selected by the user among the product names of the candidate products superimposed on the image part of the target product A of the composite image 40, to further generate a composite image 40 in which the underline is removed from "gratin". Then, the feedback unit 404 outputs the correct product name "rice gratin with shrimp" to the terminal-side communication unit 409, and the terminal-side communication unit 409 transmits this correct product name to the product recognition server 300.

Further, if, for example, the user has touched the "candidate" button 61 in a state in which the user has selected the target product B by touching the image part of the target product B in the composite image 40, the output unit 403 may arrange, regarding the target product B, product names of five candidate products "small salad", "cold udon", "croquette", "fried chicken", and "Korean vegetable stew" in the candidate product list 50 in a descending order of the degree of similarity.

Then, after the user touches the "confirm" button 71 on the screen 30, the product names of the target products A and B are confirmed, and the settlement processing unit 410 calculates the total amount of the products that the user purchases, for example, and performs settlement processing.

According to the second example embodiment, it is possible to provide a product recognition system 200 that reduces the increase in the learning time and the compression of the storage area. Specifically, when the product name of the target product identified by the identification unit 304 is erroneous and the correct product name has been specified by the user, the image management unit 305 determines whether or not the product name of the target product identified by the identification unit 304 and the correct product name specified by the user are stored in the similar image product name list 312 in such a way that they are associated with each other. Then, when the product name of the target product identified by the identification unit 304 and the correct product name specified by the user are not stored in the similar image product name list 312 in such a way that they are associated with each other, the image management unit 305 stores the image information of the target product and the correct product name in the image database 311 in such a way that they are associated with each other. It is therefore possible to prevent similar image information pieces from being stored in the image database 311 for a plurality of product names with no difference in appearance characteristics, such as breads with similar shapes but different contents, whereby it is possible to reduce compression of the storage area. Further, it is possible to reduce the increase in the learning time, which occurs due to an increase in the amount of data stored in the image database 311. Accordingly, it is possible to provide a product recognition system 200 that reduces the increase in the learning time and the compression of the storage area.

Further, when the product name of the target product identified by the identification unit 304 is erroneous and the product name of the target product and the correct product name specified by the user are stored in the similar image product name list 312 in such a way that they are associated with each other, the image management unit 305 measures the number of times the image information of the target product and the correct product name are stored in the image database 311 in such a way that they are associated with each other. Then, when the number of times exceeds a predetermined value, the image management unit 305 stops storing the image information of the target product and the correct product name in the image database 311. Accordingly, image information of each of the plurality of products having similar appearances can be stored in the image database 311, but it is possible to prevent similar image information regarding the plurality of products whose appearances are similar to each other from being stored in the image database 311 more than a necessary number of times, whereby it is possible to reduce compression of the storage area.

Further, in the candidate product list 50, the product names of the candidate products are arranged in a descending order of the degree of similarity in such a way that one of them can be selected. Accordingly, the user can first visually recognize the product name of the candidate product that is highly likely to be the correct target product in the candidate product list 50.

Further, the output unit 403 further generates a composite image in which the product name selected by the user is newly underlined among the product names superimposed on the image part of the target product in the composite image 40. Accordingly, the user can visually recognize which product he/she has selected by checking the composite image 40.

Note that, the functions of the learning unit 302 and the identification unit 304, and the identification engine 313 provided in the product recognition server 300 in the above second example embodiment may be provided in the POS terminal apparatus 400, and identification processing of the target product may be performed in the POS terminal apparatus 400.

Further, the similar image product name list 312 may be included in the POS terminal apparatus 400. In this case, the feedback unit 404 may determine whether or not the product name of the target product identified by the identification unit 304 and the correct product name specified by the user are stored in the similar image product name list 312 in such a way that they are associated with each other. Then, when the product name of the target product and the correct product name specified by the user are not stored in the similar image product name list 312 in such a way that they are associated with each other, the feedback unit 404 may output the correct product name to the terminal-side communication unit 409 and the terminal-side communication unit 409 may transmit this correct product name to the product recognition server 300.

Third Example Embodiment

Figure 8:
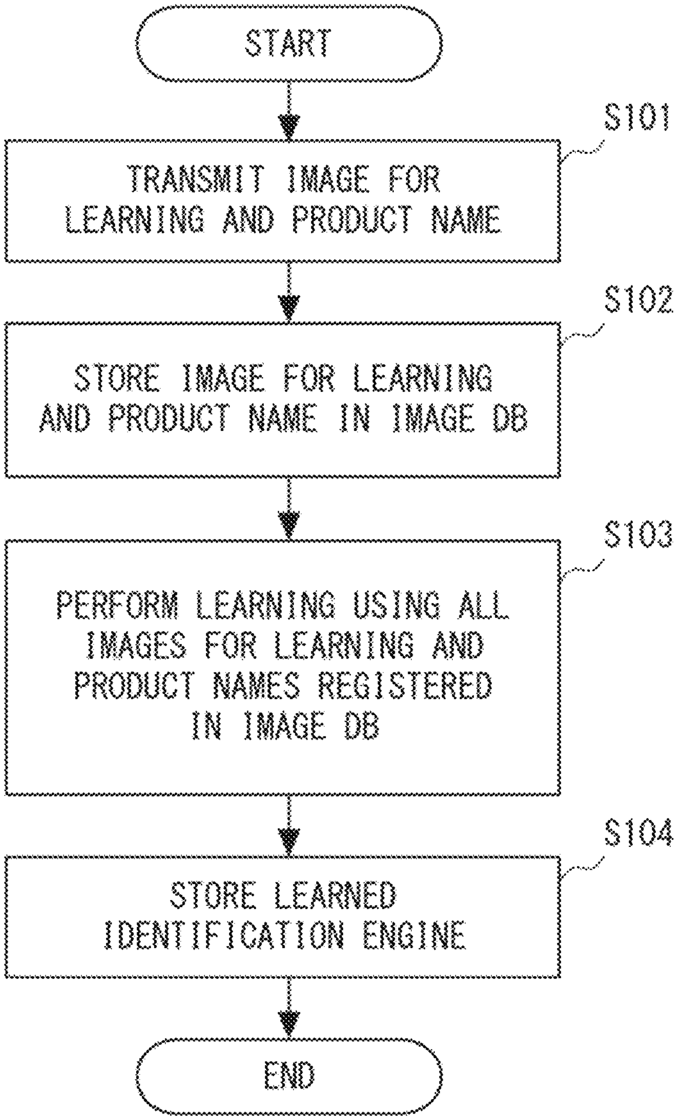
FIG. 8 is a flowchart showing learning processing in a product recognition method according to a third example embodiment.
Figure 9:
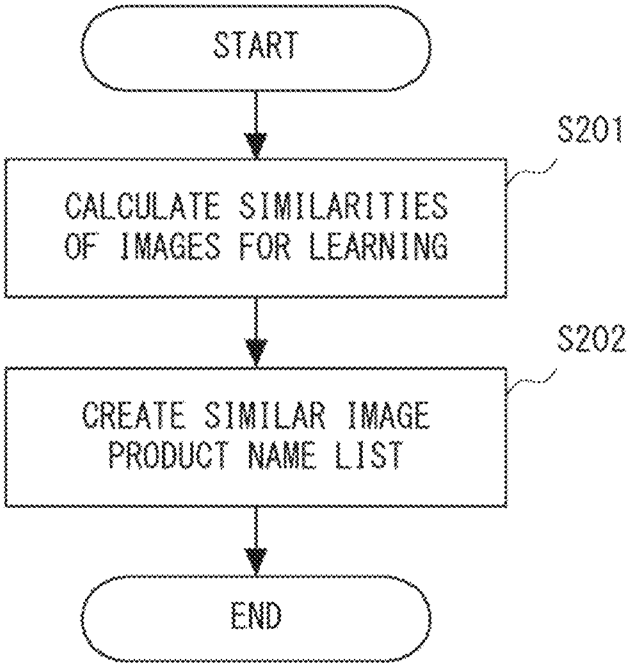
FIG. 9 is a flowchart showing processing for creating a similar image product name list in the product recognition method according to the third example embodiment.
Figure 10:
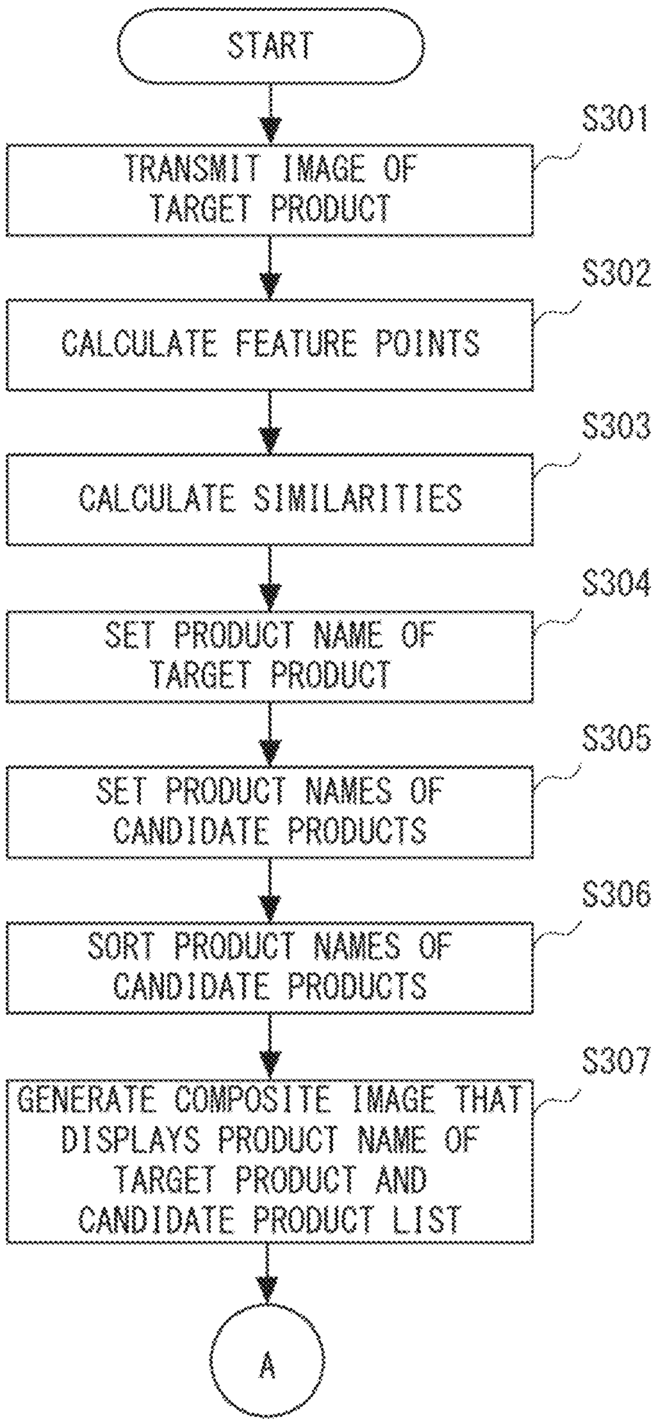
FIG. 10 is a flowchart showing identification processing in the product recognition method according to the third example embodiment.
Figure 11:
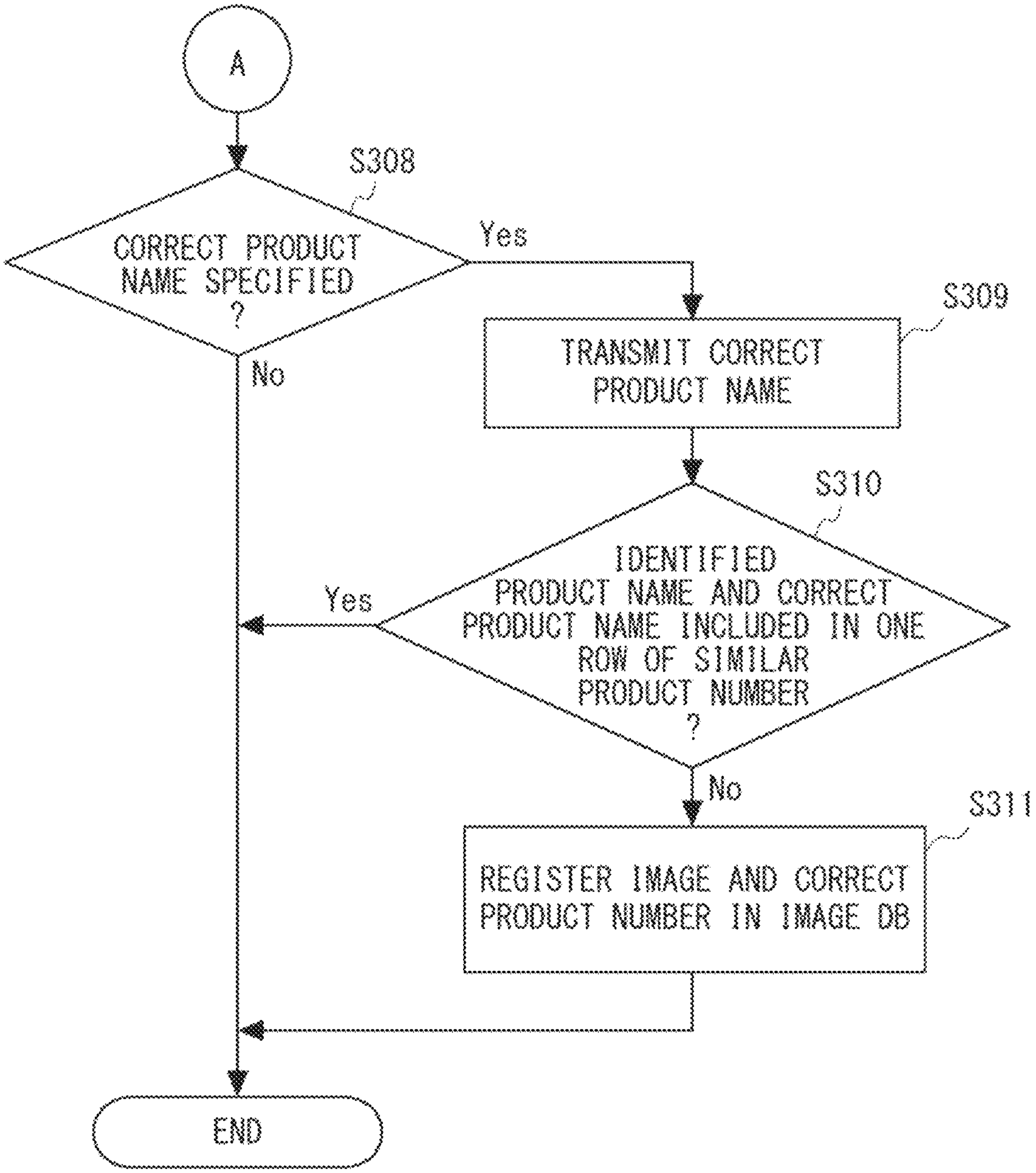
FIG. 11 is a flowchart showing identification processing in the product recognition method according to the third example embodiment.

With reference to FIGS. 8 to 11, a product recognition method according to a third example embodiment will be described. The production recognition method according to the third example embodiment is a method implemented by the product recognition system 200 according to the present disclosure. FIG. 8 is a flowchart showing learning processing in the product recognition method. FIG. 9 is a flowchart showing processing for creating the similar image product name list in the product recognition method. FIGS. 10 and 11 are flowcharts showing identification processing in the product recognition method.

First, the learning processing shown in FIG. 8 will be described. First, the imaging unit 401 acquires the image for learning of the product, and the terminal-side communication unit 409 associates the product name of the product with the image for learning and transmits the associated information to the product recognition server 300 (Step S101). Note that the imaging unit 401 may read a product identification code (product identification information) to transmit the product name, the product identification code, and the image for learning associated with one another to the product recognition server 300.

Next, the learning data acquisition unit 301 receives the product name of the product and the image for learning transmitted from the POS terminal apparatus 400, and stores the product name and the image for learning in the image database 311 in such a way that they are associated with each other (Step S102). Further, the learning data acquisition unit 301 calculates one or more feature points from the image for learning, and stores these feature points in association with the product name and the image for learning in the image database 311. Note that the learning data acquisition unit 301 may store the product name, the product identification code, and the image for learning in the image database 311 in such a way that they are associated with one another. Further, the image for learning and the product name may be registered in the image database 311 by the user.

Next, the learning unit 302 performs machine learning using the images for learning and the product names stored in the image database 311 stored in the server-side storage unit 309 (Step S103). Specifically, the learning unit 302 inputs the image for learning stored in the image database 311 to the identification engine 313 to cause the product name to be inferred, and updates the weight of the parameter used in the identification engine 313 in such a way that the result of inference (product name) becomes the product name (ground-truth label) stored in the image database 311.

Next, after the machine learning in Step S103 is ended, the learning unit 302 stores the learned identification engine 313 in the server-side storage unit 309 (Step S104) and ends the learning processing.

Next, processing for creating the similar image product name list 312 shown in FIG. 9 will be described. First, the list creation unit 303 compares feature points of the image for learning of one product stored in the image database 311 with feature points of an image for learning of another product to calculate the degree of similarity (Step S201).

Next, the list creation unit 303 creates a similar image product name list 312 in which product names of a plurality of products whose degrees of similarity calculated in Step S201 are equal to or larger than a predetermined value are associated with one another (Step S202). Then, the list creation unit 303 stores the created similar image product name list 312 in the server-side storage unit 309 and then this creation processing is ended.

Next, identification processing shown in FIGS. 10 and 11 will be described. First, the imaging unit 401 acquires an image of the target product, and the terminal-side communication unit 409 transmits the image of the target product to the product recognition server 300 (Step S301). Note that the imaging unit 401 may collectively photograph a plurality of target products, and an image including image parts of the plurality of target products may be transmitted to the product recognition server 300. Further, the imaging unit 401 may read a product identification code (product identification information), and the product identification code of the target product associated with the image may be transmitted to the product recognition server 300.

Next, the identification unit 304 inputs the image of the target product transmitted from the POS terminal apparatus 400 in Step S301 into the identification engine 313, and the identification engine 313 calculates feature points (Step S302).

Next, the identification engine 313 compares the feature points of the image of the target product calculated in Step S302 with features point of the reference image of the product stored in the image database 311 to calculate the degree of similarity (score) (Step S303). The identification engine 313 outputs, as a result of inference, the product name of the product stored in the image database 311 and the calculated degree of similarity in association with each other.

Next, the identification unit 304 sets, as the product name of the target product, the product name whose degree of similarity calculated in Step S303 is the highest among the product names stored in the image database 311 (Step S304). Then, the server-side communication unit 310 transmits the product name of the target product and the degree of similarity to the POS terminal apparatus 400.

Next, the identification unit 304 sets a predetermined number of product names among the product names stored in the image database 311 as the product names of the candidate products in a descending order of the degree of similarity calculated in Step S303 (Step S305). Then, the server-side communication unit 310 transmits the product names of the candidate products and the degrees of similarity to the POS terminal apparatus 400.

Next, the sorting unit 402 sorts the product names of the candidate products transmitted from the product recognition server 300 in a descending order of the degree of similarity (Step S306).

Next, the output unit 403 generates the composite image 40 that displays the product name of the target product that is set in Step S304 and the candidate product list 50 in which the product names of the candidate products are arranged in accordance with the order sorted in Step S306 in such a way that one of them can be selected (Step S307). Then, the composite image 40 and the candidate product list 50 generated by the output unit 403 are output to the display unit 407 and displayed on the display unit 407.

When the product name of the target product set in Step S305 is erroneous, the user specifies the correct product name from the candidate product list 50. Therefore, the feedback unit 404 determines whether or not the correct product name has been specified by the user (Step S308).

When the correct product name has not been specified by the user in Step S308 (Step S308; No), this processing is ended.

When the correct product name has been specified by the user in Step S308 (Step S308; Yes), the terminal-side communication unit 409 transmits the correct product name to the product recognition server 300 (Step S309).

Next, the image management unit 305 determines whether or not the product name of the target product that is set in Step S304 and the correct product name transmitted from the POS terminal apparatus 400 in Step S309 are included in one row of the similar product number 312A in the similar image product name list 312 (Step S310). In other words, the image management unit 305 determines whether or not the product name of the target product that is set and the correct product name are stored in the similar image product name list 312 in such a way that they are associated with each other.

When the product name of the target product that is set and the correct product name are included in one row of the similar product number 312A in the similar image product name list 312 in Step S310 (Step S310; Yes), this processing is ended.

When the product name of the target product that is set and the correct product name are not included in one row of the similar product number 312A in the similar image product name list 312 in Step S310 (Step S310; No), the image management unit 305 stores the image information of the target product and the correct product name in the image database 311 in such a way that they are associated with each other (Step S311), and then this processing is ended.

Note that in Step S310, when the product name of the target product that is set and the correct product name are included in one row of the similar product number 312A in the similar image product name list 312 (Step S310; Yes), the image management unit 305 may store the image information of the target product and the correct product name in the image database 311 in such a way that they are associated with each other and measure the number of times it is stored. Then, after the number of times exceeds the predetermined value, the image management unit 305 may stop storing the image information of the target product and the correct product name in the image database 311.

OTHER EXAMPLE EMBODIMENTS

Next, a product recognition method according to other example embodiments will be described in brief. The product recognition method according to the other example embodiments is a method implemented by the product recognition apparatus 100 according to the present disclosure.

First, the learning unit 111 performs machine learning using the image information for learning and the product name stored in the image database 131 to generate a learned identification engine 133. Further, the learning unit 111 stores the learned identification engine 133 that has been generated in the storage unit 130.

Next, the identification unit 121 identifies the product name of the target product based on the image information of the target product using the learned identification engine 133. Specifically, the identification unit 121 inputs the image information of the target product to the identification engine 133 to cause the product name of the target product to be inferred, and outputs a product name as a result of inference. The product name output from the identification unit 121 is displayed on a display unit (not shown) of the product recognition apparatus 100 and presented to the user. When the product name displayed on the display unit (not shown) of the product recognition apparatus 100 is erroneous, the user specifies the correct product name by operating an input unit (not shown) of the product recognition apparatus 100.

Next, the image management unit 122 determines whether or not the correct product name has been specified by the user. When the correct product name has not been specified by the user, this processing is ended. When the correct product name has been specified by the user, the image management unit 122 determines whether or not the product name identified by the identification unit 121 and the correct product name specified by the user are stored in the similar image product name list 132 in such a way that they are associated with each other.

When the product name identified by the identification unit 121 and the correct product name specified by the user are stored in the similar image product name list 132 in such a way that they are associated with each other, this processing is ended.

When the product name identified by the identification unit 121 and the correct product name specified by the user are not stored in the similar image product name list 132 in such a way that they are associated with each other, the image management unit 122 stores the image information of the target product and the correct product name in the image database 131 in such a way that they are associated with each other.

While the present invention has been described as a configuration of hardware in the aforementioned example embodiments, the present invention is not limited to this configuration. The present invention is able to implement the process procedure described in the flowcharts shown in FIGS. 8-11 and the process procedure described in the other example embodiments by causing a Central Processing Unit (CPU) to execute a computer program.

In the above examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (e.g., mask ROM, PROM (Programmable ROM), EPROM (Erasable PROM), flash ROM, and RAM (Random Access Memory), etc.) The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the present invention has been described above with reference to the example embodiments, the present invention is not limited to the aforementioned example embodiments. Various changes that may be understood by one skilled in the art within the scope of the invention may be made to the configuration and the details of the present invention.

This application is based upon and claims the benefit of priority from Japanese patent application No. 2022-010869, filed on Jan. 27, 2022, the disclosure of which is incorporated herein in its entirety by reference.

INDUSTRIAL APPLICABILITY

It is possible to provide a product recognition apparatus, a product recognition system, a product recognition method, and a program that reduce the increase in the learning time and the compression of the storage area.

REFERENCE SIGNS LIST

100 PRODUCT RECOGNITION APPARATUS
200 PRODUCT RECOGNITION SYSTEM
300 PRODUCT RECOGNITION SERVER
400 POS TERMINAL APPARATUS (TERMINAL APPARATUS)
111, 302 LEARNING UNIT (LEARNING MEANS)
121, 304 IDENTIFICATION UNIT (IDENTIFICATION MEANS)
122, 305 IMAGE MANAGEMENT UNIT (IMAGE MANAGEMENT MEANS)
130 STORAGE UNIT (STORAGE MEANS)
131, 311 IMAGE DATABASE
132, 312 SIMILAR IMAGE PRODUCT NAME LIST
133, 313 IDENTIFICATION ENGINE
309 SERVER-SIDE STORAGE UNIT (STORAGE MEANS)
401 IMAGING UNIT (ACQUISITION MEANS)
404 FEEDBACK UNIT

What is claimed is:

1. A product recognition apparatus comprising:

a memory storing instructions; and one or more processors configured to execute the instructions to:

store in advance, regarding each of a plurality of products, an image database in which at least image information for learning and a product name are associated with each other;

perform machine learning using the image information for learning and the product name stored in the image database to generate a learned identification engine; and identify a product name of a target product based on image information of the target product using the learned identification engine, wherein the one or more processors are configured to execute the instructions to:

store in advance, when the image information for learning of one product is similar to the image information for learning of another product, a similar image product name list in which the product name of the one product and the product name of the another product are associated with each other;

determine, when the product name of the target product identified by the one or more processors is erroneous and a correct product name has been specified by a user, whether or not the product name identified by the one or more processors and the correct product name are stored in the similar image product name list in such a way that they are associated with each other, and store, when the product name identified by the one or more processors and the correct product name are not stored in the similar image product name list in such a way that they are associated with each other, the image information of the target product and the correct product name in the image database in such a way that they are associated with each other; and the one or more processors are configured to execute the instructions to:

measure, when the product name of the target product identified by the one or more processors is erroneous and the product name identified by the one or more processors and the correct product name specified by the user are stored in the similar image product name list in such a way that they are associated with each other, a number of times the image information of the target product and the correct product name are stored in the image database in such a way that they are associated with each other, and stop, when the number of times exceeds a predetermined value, storage of the image information of the target product and the correct product name in the image database.

2. A product recognition method, wherein a product recognition apparatus:

stores in advance, regarding each of a plurality of products, an image database in which at least image information for learning and a product name are associated with each other;

performs machine learning using the image information for learning and the product name stored in the image database to generate a learned identification engine;

identifies a product name of a target product based on the image information of the target product using the learned identification engine;

further stores in advance, when the image information for learning of one product is similar to the image information for learning of another product, a similar image product name list in which the product name of the one product and the product name of the another product are associated with each other;

determines, when the identified product name of the target product is erroneous and the correct product name has been specified by a user, whether or not the identified product name and the correct product name are stored in the similar image product name list in such a way that they are associated with each other, and stores, when the identified product name and the correct product name are not stored in the similar image product name list in such a way that they are associated with each other, the image information of the target product and the correct product name in the image database in such a way that they are associated with each other;

measures, when the identified product name of the target product is erroneous and the identified product name and the correct product name specified by the user are stored in the similar image product name list in such a way that they are associated with each other, a number of times the image information of the target product and the correct product name are stored in the image database in such a way that they are associated with each other; and stops, when the number of times exceeds a predetermined value, storage of the image information of the target product and the correct product name in the image database.

3. A non-transitory computer readable medium storing a program causing a product recognition apparatus to execute:

processing for storing in advance, regarding each of a plurality of products, an image database in which at least image information for learning and a product name are associated with each other;

processing for performing machine learning using the image information for learning and the product name stored in the image database to generate a learned identification engine;

processing for identifying, using the learned identification engine, a product name of a target product based on image information of the target product; and processing for further storing in advance, when the image information for learning of one product is similar to the image information for learning of another product, a similar image product name list in which the product name of the one product and the product name of the another product are associated with each other; and processing for determining, when the identified product name of the target product is erroneous and the correct product name has been specified by a user, whether or not the identified product name and the correct product name are stored in the similar image product name list in such a way that they are associated with each other and storing, when the identified product name and the correct product name are not stored in the similar image product name list in such a way that they are associated with each other, the image information of the target product and the correct product name in the image database in such a way that they are associated with each other;

processing for measuring, when the identified product name of the target product is erroneous and the identified product name and the correct product name specified by the user are stored in the similar image product name list in such a way that they are associated with each other, a number of times the image information of the target product and the correct product name are stored in the image database in such a way that they are associated with each other; and processing for stopping, when the number of times exceeds a predetermined value, storage of the image information of the target product and the correct product name in the image database.

* * * * *